(12) United States Patent
Nortier

(10) Patent No.: US 6,499,716 B2
(45) Date of Patent: Dec. 31, 2002

(54) FLUSH VALVE DUAL SEAL GASKET

(75) Inventor: Richard A. Nortier, Westchester, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

(21) Appl. No.: 09/794,804

(22) Filed: Feb. 27, 2001

(65) Prior Publication Data

US 2002/0117641 A1 Aug. 29, 2002

(51) Int. Cl.⁷ ............................................... F16K 31/14
(52) U.S. Cl. ............................................................ 251/40
(58) Field of Search ........................... 251/40, 38, 30.04

(56) References Cited

U.S. PATENT DOCUMENTS

| | | | | |
|---|---|---|---|---|
| 2,046,004 A | * | 6/1936 | Sloan | 251/40 X |
| 2,082,226 A | * | 6/1937 | Stafford | 251/40 X |
| 2,122,189 A | * | 6/1938 | Ward | 251/40 X |
| 4,202,525 A | * | 5/1980 | Govaer et al. | 251/40 |
| 5,476,244 A | * | 12/1995 | Carroll et al. | 251/40 |
| 5,881,993 A | * | 3/1999 | Wilson et al. | 251/40 X |

* cited by examiner

Primary Examiner—Henry C. Yuen
Assistant Examiner—Eric Keasel
(74) Attorney, Agent, or Firm—Cook, Alex, McFarron, Manzo, Cummings & Mehler, Ltd.

(57) ABSTRACT

A flush valve includes a body with an inlet and an outlet and a valve seat at the outlet. There is a piston assembly movable in the body toward and away from the valve seat to control flow from the inlet to the outlet. There is a pressure chamber in the flush valve body which maintains the piston assembly on its valve seat. The piston assembly includes a refill orifice connecting the pressure chamber with the body inlet. There is a relief valve in the piston assembly for venting the pressure chamber to the outlet. The piston assembly includes a guide and a piston attached thereto. There is a seal having an annular perimeter portion which is positioned between facing surfaces of the guide and piston and the seal has an annular interior portion positioned on the relief valve seat to form a seal with a relief valve. The seal interior portion and perimeter portion are connected by plurality of radially extending ribs permitting a degree of relative movement between the seal interior and perimeter portions.

6 Claims, 1 Drawing Sheet

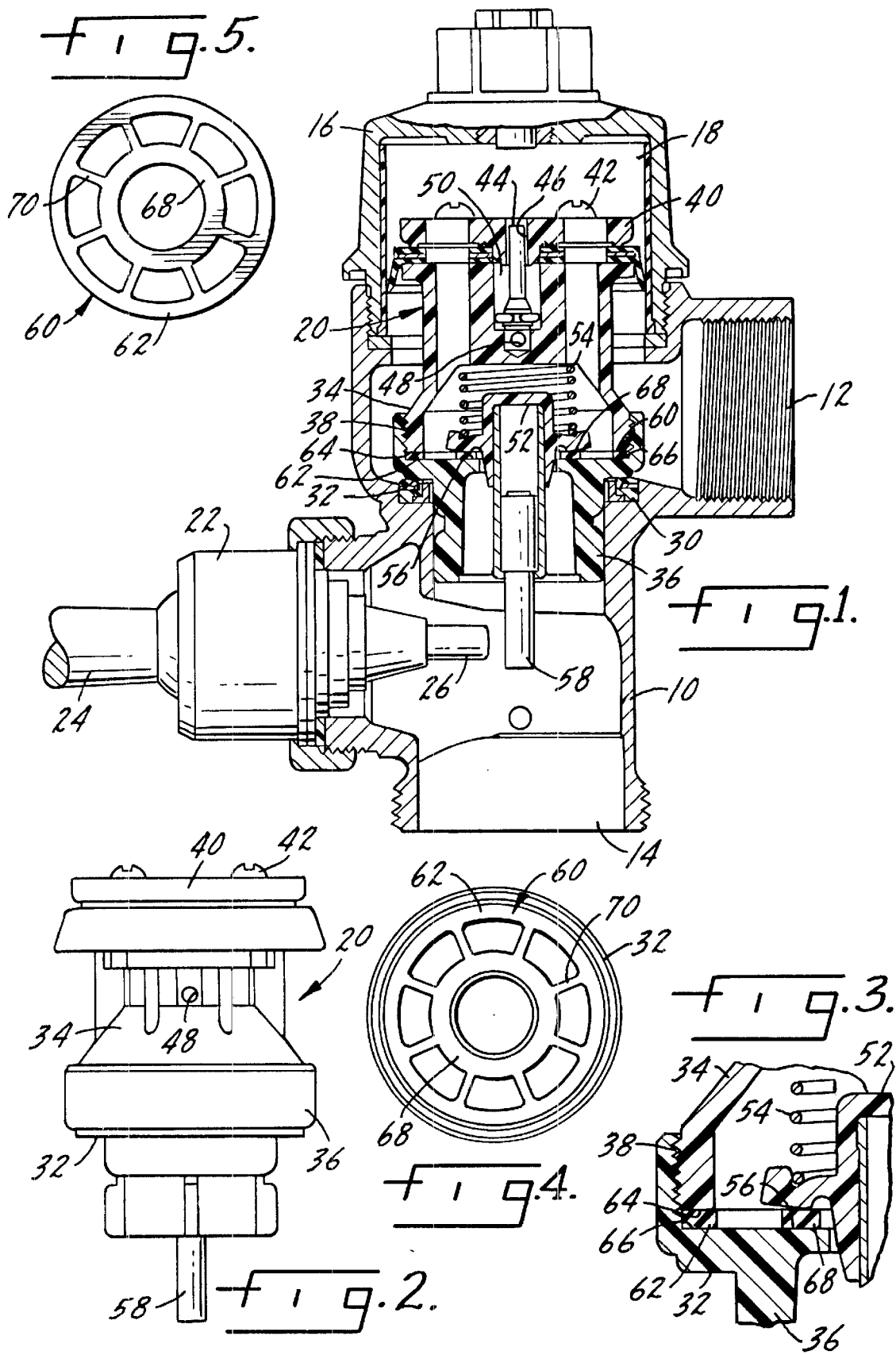

FLUSH VALVE DUAL SEAL GASKET

THE FIELD OF THE INVENTION

The present invention relates to flush valves for use in connection with toilet devices such as urinals and water closets, and more specifically, to a piston type flush valve. More particularly, the invention relates to a specific improvement in the seal between the piston and guide of the flush valve piston assembly, which seal also functions in cooperation with the piston assembly relief valve. In prior art flush valves of the type manufactured by Sloan Valve Company of Franklin Park, Illinois, the assignee of the present invention, there is a single seal which is positioned between the piston and guide of the flush valve, which seal also cooperates with the piston assembly relief valve. At times, if this seal is over-torqued when assembling the piston to the guide, the seal may wrinkle, preventing full closure of the relief valve.

The present invention improves the seal for the piston assembly by having a perimeter portion which provides a seal between the piston and its guide and an interior portion which seals at the relief valve seat. The perimeter portion and the interior portion are connected together by integral ribs which absorb any buckling force at the perimeter seal to maintain concentricity of the interior seal at the relief valve seat.

SUMMARY OF THE INVENTION

The present invention relates to piston type flush valve for use with urinals and water closets, and more specifically, to an improved dual function seal for use in the piston assembly.

A primary purpose of the invention is to provide a dual function seal for the described environment which has a perimeter portion sealing between the piston and the guide and an interior portion which seals at the relief valve seat.

Another purpose is a dual seal as described in which the perimeter portion and the interior portion are connected together by a plurality of radially extending ribs which permit a degree of relative movement between the interior and exterior portions.

Another purpose is a seal as described which maintains concentricity of the interior seal even if the exterior seal is over-torqued when assembling the piston to the guide.

Another purpose of the invention is to provide a seal for the use described which creates a semi-permanent seal at the outer perimeter between the upper and lower parts of the piston assembly for the life of the piston assembly and creates a semi-dynamic seal at the interior which allows the relief valve to move relative to its seat during the flush cycle.

Another purpose is to provide a seal for the described environment which has two separate sealing areas connected by several small integral ribs.

Other purposes will appear in the ensuing specification, drawings and claims.

BRIEF DESCRIPTION OF THE DRAWINGS

The invention is illustrated diagrammatically in the following drawings wherein:

FIG. 1 is a partial axial section through a flush valve of the type described;

FIG. 2 is a side view of the piston assembly;

FIG. 3 is an enlarged partial section showing the perimeter and interior portions of the seal in position in the piston assembly;

FIG. 4 is a top view of the seal positioned on the guide;

FIG. 5 is a plan view of the seal.

DESCRIPTION OF THE PREFERRED EMBODIMENT

The present invention relates to flush valves for use with urinals and water closets, and more specifically, to a valve sold by Sloan Valve Company of Franklin Park, Illinois, under the trademark NAVAL. This valve utilizes a piston assembly to control flow between the flush valve inlet and outlet. More specifically, the invention relates to an improvement in the seal which is located between two parts of the piston assembly and which also functions to form a closure at the relief valve seat. The seal creates a semi-permanent seal at its outer perimeter between the piston assembly piston and guide. The inner portion of the seal creates a semi-dynamic seal that allows the relief valve to move relative to its seat when the flush cycle is initiated and to close off the area above the relief valve when it is at rest. The perimeter portion and the interior portion are connected by radially extending ribs which will clear any of the alignment elements found on early style piston assemblies for use in valves of this type. Thus, the gasket can be used not only on new flush valves, but also on valves of this type which are currently in the field.

The particular dual function gasket or seal is advantageous in that at times when the piston is threadedly attached to the guide, there can be deformation of the seal due to excessive torque. The particular configuration of the seal prevents any deformation of the outer sealing area from being translated to the inner sealing area. In present seals for the use described, such applied torque can impart a buckling to the inner portion of the seal to the point where it will not function to close off the relief valve and hence the flush valve will not correctly operate. The present invention provides a distinct improvement on the prior art in that functionally the inner portion of the seal and the perimeter portion of this seal are separate, with connecting ribs permitting a degree of relative movement therebetween. Thus, if an over-torque or an excessive amount of torque is applied during assembly of the piston to the guide, this does not stress the interior portion which seals at the relief valve seat.

In FIG. 1, the flush valve body is indicated at 10 and has an inlet 12 and an outlet 14. There is a top cover 16 which is threadedly attached to the body 10 and defines a pressure chamber 18 positioned above a piston assembly indicated generally at 20.

Adjacent to the outlet 14, there is a handle assembly 22 which has a conventional manual handle 24 which, when activated, will move an interior plunger 26 which will cause the relief valve of the piston assembly to move off its seat to institute the flushing cycle. This is conventional in valves of this type.

The body 10 includes a valve seat 30, with the piston assembly 20 having a surface 32 which closes upon the valve seat to close flow between the inlet 12 and the outlet 14.

The piston assembly 20 includes a piston 34 and a guide 36 threadedly attached, as at 38. The piston assembly has a top plate 40 mounted by screws 42 to the piston 34. A rod 44 moves within a passage 46 in the top plate 40 to control the flow of water from an opening 48 in the piston 34. The opening 48 is connected to the inlet 12 and water will flow through the opening 48 into a chamber 50 around the rod and then outwardly through the passage 46 into the pressure chamber 18. The space between rod 44 and passage 46 functions as the bypass orifice. Water within the pressure chamber 18 maintains the piston assembly on its valve seat 30 to close flow between the inlet and outlet.

There is a relief valve 52 biased by a spring 54 onto a relief valve seat 56. The relief valve has a stem 58 which extends downwardly into the body 10 and is positioned adjacent the plunger 26. In operation, when the handle, functioning as a means for opening the relief valve, is moved, the plunger will move into the body 10 causing the relief valve to tilt off its seat, permitting the pressure chamber 18 to vent through the outlet 14 and permitting the piston assembly to thereby move up, off its seat 30, so that there is direct flow between the inlet and the outlet. As is known in the art, flow through the bypass orifice determines flow into the pressure chamber 18 to control the time during which the piston is off the valve seat and thus the volume of flow through the flush valve.

The present invention is specifically concerned with the seal 60 shown in detail in FIGS. 4 and 5. The seal has a perimeter portion 62, which is positioned between facing surfaces 64 and 66, respectively, of the piston and guide to form a seal between these two elements during assembly of the piston assembly. This is a semi-permanent and static seal. The seal 60 has an interior portion 68 which is located on the relief valve seat 56 and cooperates with the relief valve to prevent flow from the pressure chamber to the flush valve outlet 14. This is a dynamic seal. As shown particularly in FIG. 5, the perimeter seal portion 62 and the interior seal portion 68 are connected together by a plurality of equally spaced integral radial ribs 70. As shown in both FIGS. 4 and 5, the ribs 70 are separated by spaces, each of which is greater in circumferential extent than the circumferential thickness of a rib. These ribs permit the interior portion of the seal to maintain concentricity, even if there should be excessive rotational stress applied to the perimeter portion during assembly of the guide to the piston. Any buckling force applied to the perimeter seal will be absorbed by the ribs and they will apply no stress to the seal interior portion which functions at the relief valve seat.

Whereas the preferred form of the invention has been shown and described herein, it should be realized that there may be many modifications, substitutions and alterations thereto.

The embodiments of the invention in which an exclusive property or privilege is claimed are defined as follows:

1. A flush valve including a body having an inlet and an outlet, a valve seat at said outlet, a piston assembly movable in said body toward and away from said valve seat to control flow from said inlet through said outlet, a pressure chamber in said body above said piston assembly and normally maintaining said piston assembly closed upon said valve seat, said piston assembly including a refill orifice connecting said chamber with said body inlet, a relief valve in said piston assembly for venting said chamber to said outlet, means for opening said relief valve to vent said chamber causing said piston assembly to move away from said valve seat to open flow through said outlet, said piston assembly including a guide and a piston attached thereto, a seal having an annular perimeter portion between facing surfaces of said guide and piston, said seal having an annular interior portion positioned to form a seal with said relief valve, and a plurality of spaced ribs integral with and connecting said seal perimeter portion, spaces between said ribs, with each space having a circumferential extent greater than the circumferential width of a rib to permit relative movement between said seal perimeter portion and said seal interior portion.

2. The flush valve of claim 1 wherein said perimeter portion and interior portion are concentric, and said ribs extend radially between said interior portion and perimeter portion.

3. The flush valve of claim 2 wherein said ribs are equally spaced, one from another.

4. A piston assembly for use in a flush valve body having an inlet and an outlet, and a valve seat at said outlet, the piston assembly being movable in said body toward and away from the valve seat to control flow from the inlet through the outlet, a relief valve in said piston assembly for venting a flush valve pressure chamber to the flush valve outlet, a seat in said piston assembly for said relief valve, said piston assembly including a guide and a piston attached thereto, a seal having an annular perimeter portion between facing surfaces of said guide and piston, said seal having an annular interior portion positioned on said relief valve seat to form a seal with said relief valve, and a plurality of spaced ribs integral with and connecting said seal perimeter portion and said seal interior portion, spaces between said ribs, with each space having a circumferential extent greater than the circumferential width of a rib to permit relative movement between said seal perimeter portion and said seal interior portion.

5. The piston assembly of claim 4 wherein said perimeter portion and interior portion are concentric, and said ribs extend radially between said interior portion and perimeter portion.

6. The piston assembly of claim 5 wherein said ribs are equally spaced, one from another.

* * * * *